(12) United States Patent
Xu et al.

(10) Patent No.: US 11,134,507 B2
(45) Date of Patent: Sep. 28, 2021

(54) METHOD AND APPARATUS FOR PROCESSING SCHEDULING REQUEST

(71) Applicant: Huawei Technologies Co., Ltd., Shenzhen (CN)

(72) Inventors: Xiaoying Xu, Shanghai (CN); Qinghai Zeng, Shanghai (CN); Qufang Huang, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/522,335

(22) Filed: Jul. 25, 2019

(65) Prior Publication Data
US 2019/0349961 A1    Nov. 14, 2019

Related U.S. Application Data

(63) Continuation of application No. PCT/CN2018/074031, filed on Jan. 24, 2018.

(30) Foreign Application Priority Data
Jan. 26, 2017   (CN) .......................... 201710057477.7

(51) Int. Cl.
*G01R 31/08* (2020.01)
*H04W 72/12* (2009.01)

(52) U.S. Cl.
CPC ... *H04W 72/1242* (2013.01); *H04W 72/1268* (2013.01)

(58) Field of Classification Search
None
See application file for complete search history.

(56) References Cited

U.S. PATENT DOCUMENTS

| 8,750,225 B2 | 6/2014 | Dong |
| 9,363,139 B2* | 6/2016 | Barrett ................... H04W 8/08 |
| 9,648,515 B2* | 5/2017 | Velev .................... H04W 28/12 |

(Continued)

FOREIGN PATENT DOCUMENTS

| CN | 101980575 A | 2/2011 |
| CN | 104170491 A | 11/2014 |

(Continued)

OTHER PUBLICATIONS

"UL scheduling enhancement in NR," 3GPP TSG-RAN2 Meeting #Adhoc, Spokane, Washington, USA, R2-1700175, XP051210760, pp. 1-4, 3rd Generation Partnership Project, Valbonne, France (Jan. 17-19, 2017).

*Primary Examiner* — Gerald A Smarth
(74) *Attorney, Agent, or Firm* — Leydig, Voit & Mayer, Ltd.

(57) ABSTRACT

This application provides a scheduling request processing method and an apparatus. The method includes: determining, by a terminal device, that a condition for triggering a scheduling request SR of a first service is met; determining, by the terminal device, whether a priority of the first service is higher than a priority of a second service for which a scheduling request SR has been triggered or has been sent; and when determining that the priority of the first service is higher than the priority of the second service, triggering and/or sending, by the terminal device, the SR of the first service.

9 Claims, 7 Drawing Sheets

100

A terminal device determines that a condition for triggering a scheduling request SR of a first service is met — S110

The terminal device determines whether a priority of the first service is higher than a priority of a second service for which a scheduling request SR has been triggered or has been sent — S120

When determining that the priority of the first service is higher than the priority of the second service, the terminal device triggers and/or sends the scheduling request SR of the first service — S130

(56) References Cited

U.S. PATENT DOCUMENTS

| | | | |
|---|---|---|---|
| 10,165,573 B2* | 12/2018 | Lee | H04W 72/1215 |
| 2009/0046641 A1* | 2/2009 | Wang | H04W 74/0866 |
| | | | 370/329 |
| 2012/0093106 A1 | 4/2012 | Dong | |
| 2012/0142336 A1* | 6/2012 | Van Phan | H04W 36/0033 |
| | | | 455/423 |
| 2013/0250828 A1* | 9/2013 | Chou | H04L 5/0053 |
| | | | 370/311 |
| 2015/0003391 A1* | 1/2015 | Chen | H04L 5/0044 |
| | | | 370/329 |
| 2015/0049697 A1 | 2/2015 | Worrall et al. | |
| 2015/0063233 A1* | 3/2015 | Choi | H04W 72/0446 |
| | | | 370/329 |
| 2015/0223235 A1 | 8/2015 | Hwang et al. | |
| 2015/0257161 A1* | 9/2015 | Hsu | H04L 65/80 |
| | | | 455/453 |
| 2016/0021646 A1* | 1/2016 | Hu | H04W 52/28 |
| | | | 370/329 |
| 2016/0081117 A1* | 3/2016 | Morioka | H04W 74/006 |
| | | | 370/336 |
| 2016/0183277 A1* | 6/2016 | Futaki | H04L 5/0032 |
| | | | 370/336 |
| 2018/0027493 A1* | 1/2018 | Li | H04W 72/12 |
| | | | 370/280 |
| 2018/0249479 A1* | 8/2018 | Cho | H04W 12/086 |
| 2018/0324872 A1* | 11/2018 | Babaei | H04L 5/0053 |

FOREIGN PATENT DOCUMENTS

| | | |
|---|---|---|
| EP | 1871057 A1 | 12/2007 |
| WO | 2007148927 A1 | 12/2007 |
| WO | 2013138983 A1 | 9/2013 |
| WO | 2016165387 A1 | 10/2016 |

* cited by examiner

METHOD AND APPARATUS FOR PROCESSING SCHEDULING REQUEST

CROSS-REFERENCE TO RELATED APPLICATIONS

This application is a continuation of International application PCT/CN2018/074031, filed on Jan. 24, 2018, which claims priority to Chinese Patent Application No. 201710057477.7, filed on Jan. 26, 2017. The disclosures of the aforementioned applications are hereby incorporated by reference in their entireties.

TECHNICAL FIELD

This application relates to the communications field, and more specifically, to a scheduling request processing method and apparatus in the communications field.

BACKGROUND

In a long term evolution (LTE) system, a scheduling request (SR) is a manner in which a user equipment (UE) requests a resource from a network device for new data transmission. If UE in a connected mode does not have an uplink grant but has an SR resource, the UE in the connected mode may first send an SR to request for allocation of a small quantity of resources. The SR is information at a physical layer, a radio bearer (RB) resource is not needed when the UE sends the SR, and the SR may be transmitted by using a physical uplink control channel (PUCCH). After successfully decoding an SR signal of UE, the network device may allocate an RB resource to the UE by using a downlink control message (DCI), but it cannot be ensured that the network side can allocate the RB each time. Sometimes, although the UE sends the SR signal, the SR signal fails to be decoded by the network side. After the UE sends the SR signal, it should not be expected that the network device definitely allocates the RB resource later at a specific time. In many cases, to obtain an uplink RB resource, the UE needs to send the SR request many times. A period of sending the SR is short, and to prevent the UE from sending an unnecessary SR, a prohibit timer (sr-Prohibit Timer) is used, and the timer is configured to monitor an SR signal transmitted over the PUCCH. When the timer is running, the SR cannot be sent, the SR can be sent until the timer expires, and the SR resource may be released until a maximum quantity of sending times (dsr-Trans Max) is reached, and then a contention manner in a random contention procedure is used to obtain a scheduling opportunity. In this way, load on the PUCCH is significantly reduced.

When the UE triggers an SR, the SR is in a "pending" mode, which means that the UE is ready to send but has not yet sent the SR to the network device. However, when UE assembles a media access control protocol data unit (MAC PDU), and the PDU includes a control element of a buffer status report (BSR) that is recently triggered, or a resource provided by the uplink grant can accommodate all to-be-transmitted data, the SR in the "pending" mode is canceled and the prohibit timer stops.

With extensive application of intelligent services of smart terminals (smart phone) and smart device services, there are three main types of services in the future: an enhanced mobile broadband (eMBB) service such as a video service, an ultra-reliable and low latency communications (URLLC) service such as drone control, and a massive machine type communication (mMTC) service such as meter reading. For services in different fields, resource parameter configurations used to send the different services are different, the parameter configuration may also be referred to as "numerology", for example, cyclic prefix (CP) lengths, transmission time intervals (TTI), and subcarrier spacings configured for the different services are different. Therefore, services in different fields may have different requirements for a service data transmission latency. According to a latency requirement of next-generation wireless communications, an uplink transmission latency requirement of the URLLC service is 0.5 ms, and an uplink transmission latency requirement of the eMBB service is 4 ms.

Currently, only one prohibit timer is used to control SR sending of all services, failing to meet differentiated requirements of different services.

SUMMARY

This application provides a scheduling request processing method and an apparatus, so that opportunities of triggering a scheduling request and/or sending the scheduling request of a high-priority service can be increased, a latency of sending data of the high-priority service can be reduced, and user experience is improved.

According to a first aspect, a scheduling request processing method is provided, and the method includes: determining, by a terminal device, that a condition for triggering a scheduling request SR of a first service is met; requesting, by the terminal device, an uplink resource used to send the first service; determining, by the terminal device, whether a priority of the first service is higher than a priority of a second service for which a scheduling request SR has been triggered or has been sent; and when determining that the priority of the first service is higher than the priority of the second service, triggering and/or sending, by the terminal device, the SR of the first service.

According to the scheduling request processing method provided in the first aspect, when the terminal device determines, based on service priorities, that the priority of the first service that currently needs to request the uplink resource is higher than the priority of the second service for which the scheduling request SR has been triggered or has been sent, the SR triggered or sent for the first service with the higher priority is not affected by the SR triggered and/or sent for the second service with the lower priority, that is, the SR is sent according to an original period. In this way, opportunities for triggering or sending the SR of the first service can be increased, reliability of triggering or sending the SR of the first service can be improved, a latency value is reduced, and user experience can be improved.

In a possible implementation of the first aspect, the method further includes: when an uplink resource of the SR of the first service is different from an uplink resource of the SR of the second service, independently triggering or sending, by the terminal device, the SR of the first service and the SR of the second service.

In a possible implementation of the first aspect, a first timer corresponding to the SR of the first service controls triggering or sending of the SR of the first service, and before the first timer expires, the terminal device keeps from triggering or sending the SR of the first service.

In a possible implementation of the first aspect, a second timer corresponding to the SR of the second service controls triggering or sending of the SR of the second service, and before the second timer expires, the terminal device keeps from triggering or sending the SR of the second service.

In a possible implementation of the first aspect, the method further includes: before the terminal device obtains a scheduling grant, calculating, by the terminal device by accumulating from zero, a quantity of times that the SR of the first service is sent, until a maximum quantity of sending times is reached.

In a possible implementation of the first aspect, the method further includes: when an uplink resource of the SR of the first service is the same as an uplink resource of the SR of the second service, triggering or sending, by the terminal device, only the SR of the first service, without triggering or sending the SR of the second service.

In a possible implementation of the first aspect, the method further includes: setting, by the terminal device, a value of a time length of a first timer associated with the SR of the first service to zero; or keeping from setting, by the terminal device, a first timer associated with the SR of the first service.

In a possible implementation of the first aspect, the first timer corresponding to the SR of the first service controls the triggering or sending of the SR of the first service, and the second timer corresponding to the SR of the second service controls the triggering or sending of the SR of the second service, where a value of a time length of the first timer is less than a value of a time length of the second timer.

In a possible implementation of the first aspect, the method further includes: stopping, by the terminal device, the second timer; and setting, by the terminal device, the value of the time length of the second timer to the value of the time length of the first timer, and restarting the second timer.

In a possible implementation of the first aspect, the method further includes: stopping, by the terminal device, the second timer, and associating the triggering or sending of the SR of the second service with the first timer.

In a possible implementation of the first aspect, the method further includes: stopping, by the terminal device, a second timer associated with the SR of the second service, and restarting the second timer after establishing an association between a value of a time length of the second timer and the SR of the first service.

In a possible implementation of the first aspect, the value of the time length of the timer associated with the SR of the first service is less than the value of the time length of the timer associated with the SR of the second service.

According to a second aspect, a scheduling request processing method is provided, and the method includes: determining, by a terminal device, that a condition for triggering a scheduling request SR of a first service is met; determining, by the terminal device, whether a priority of the first service is higher than a priority of a second service for which a scheduling request SR has been triggered or has been sent; and when the terminal device determines that the priority of the first service is lower than the priority of the second service, before a timer associated with the SR of the second service expires, keeps from triggering and/or sending, by the terminal device, the SR of the first service.

According to the scheduling request processing method provided in the second aspect, when the terminal device determines, based on service priorities, that the priority of the first service that currently needs to request an uplink resource is lower than the priority of the second service for which the scheduling request SR has been triggered and/or has been sent, before the timer associated with the SR of the second service expires, the first service with the lower priority does not trigger and/or does not send the SR. In this way, triggering and/or sending of the SR of the first service may be controlled by the timer associated with the SR of the second service, so that opportunities for triggering or sending the SR of the first service can be increased, reliability of triggering or sending the SR by the first service can be improved, and user experience can be improved.

In a possible implementation of the second aspect, a value of a time length of the timer associated with the SR of the second service is less than a value of a time length of a timer associated with the SR of the first service.

According to a third aspect, a scheduling request processing method is provided, and the method includes: determining, by a terminal device, that a condition for triggering a scheduling request SR of a first service is met; and determining, by the terminal device, whether an uplink resource of the scheduling request SR of the first service is the same as an uplink resource that has been used to trigger or send an SR of a second service; and when the terminal device determines that the uplink resource of the SR of the first service is different from the uplink resource of the SR of the of the second service, independently triggering and/or sending, by the terminal device, the SR of the first service and the SR of the second service.

According to the scheduling request processing method provided in the third aspect, before the first service requests the uplink resource, if the second service also requests the uplink resource, and the terminal device has triggered or has sent the SR corresponding to the second service, in this case, when the terminal device determines that the uplink resource to be used to trigger or send the SR of the first service is different from the uplink resource that has been used to trigger or send the SR of the second service, the SR of the first service and the SR of the second service may be independently sent and/or triggered, that is, the SR of the first service and the SR of the second service may be sent and/or triggered independently of each other. Therefore, efficiency of sending or triggering the SR of the first service and the SR of the second service may be improved, and reliability of sending or triggering the SR is ensured.

In a possible implementation of the third aspect, a first timer corresponding to the SR of the first service controls triggering or sending of the SR of the first service, and before the first timer expires, the terminal device keeps from triggering or sending the SR of the first service.

In a possible implementation of the third aspect, a second timer corresponding to the SR of the second service controls triggering or sending of the SR of the second service, and before the second timer expires, the terminal device keeps from triggering or sending the SR of the second service.

In a possible implementation of the third aspect, the method further includes: before the terminal device obtains a scheduling grant, calculating, by the terminal device by accumulating from zero, a quantity of times that the SR of the first service is sent, until a maximum quantity of sending times is reached.

In a possible implementation of the third aspect, the method further includes: when the terminal device determines that the uplink resource requested by the SR of the first service is the same as the uplink resource requested by the SR of the second service, and a priority of the first service is lower than a priority of the second service, keeping from triggering and/or sending, by the terminal device, the SR of the first service until the timer associated with the SR of the second service expires.

According to a fourth aspect, a scheduling request processing method is provided, and the method includes: determining, by a terminal device, a service that needs to be sent; and when the terminal device sends data of the service by using a non-scheduled resource or a contention based resource, keeping from canceling, by the terminal device, a scheduling request suspended for the service.

According to the scheduling request processing method provided in the fourth aspect, when determining the service that needs to be sent, the terminal device further obtains the non-scheduled resource used to send data of a first service. In this case, when the non-scheduled resource is used to send the data of the first service, the terminal device does not stop triggering and/or sending an SR of the first service or an SR of a second service. In this way, it can be ensured that the data of the service can be effectively transmitted to a network device; that is, when the data of the service is sent by using the non-scheduled resource, a dedicated scheduled resource is also requested. Therefore, reliability of transmitting the data of the service is improved.

In a possible implementation of the fourth aspect, the method further includes: after successfully sending the data of the service by using the non-scheduled resource or the contention based resource, stopping triggering or sending, by the terminal device, the SR of the service.

In a possible implementation of the fourth aspect, the method further includes: when obtaining a sending resource used to send data of a service whose priority is lower than that of the service, stopping triggering and/or sending, by the terminal device, the SR of the service; and sending, by the terminal device, the data of the service by using the sending resource used to send the data of the service whose priority is lower than that of the service.

In a possible implementation of the fourth aspect, the method further includes that: when the terminal device sends the data of the service by using the non-scheduled resource, a priority order is that: a buffer status report BSR that includes a data amount of the service>the data of the service>semi-persistent scheduling SPS acknowledgment>a BSR that includes a data amount of the service whose priority is lower than that of the service>the data of the service whose priority is lower than that of the service.

According to a fifth aspect, a scheduling request processing apparatus is provided, including a processor and a memory that are configured to support the apparatus in performing a corresponding function in the foregoing method. The processor is connected to the memory through communication; the memory stores a program; and the processor is configured to invoke the program to implement the scheduling request processing method in the first aspect and the implementations of the first aspect.

According to a sixth aspect, a scheduling request processing apparatus is provided, including a processing module and a storage module that are configured to support the apparatus in performing the functions in the first aspect or any possible implementation of the first aspect. The function may be implemented by hardware, or may be implemented by hardware by executing corresponding software. The hardware or software includes one or more modules corresponding to the functions.

According to a seventh aspect, a scheduling request processing apparatus is provided, including a processor and a memory that are configured to support the apparatus in performing a corresponding function in the foregoing method. The processor is connected to the memory through communication; the memory stores a program; and the processor is configured to invoke the program to implement the scheduling request processing method in the second aspect and the implementations of the second aspect.

According to an eighth aspect, a scheduling request processing apparatus is provided, including a processing module and a storage module that are configured to support the apparatus in performing the functions in the second aspect or any possible implementation of the second aspect. The function may be implemented by hardware, or may be implemented by hardware by executing corresponding software. The hardware or software includes one or more modules corresponding to the functions.

According to a ninth aspect, a scheduling request processing apparatus is provided, including a processor and a memory that are configured to support the apparatus in performing a corresponding function in the foregoing method. The processor is connected to the memory through communication; the memory stores a program; and the processor is configured to invoke the program to implement the scheduling request processing method in the third aspect and the implementations of the third aspect.

According to a tenth aspect, a scheduling request processing apparatus is provided, including a processing module and a storage module that are configured to support the apparatus in performing the functions in the third aspect or any possible implementation of the third aspect. The function may be implemented by hardware, or may be implemented by hardware by executing corresponding software. The hardware or software includes one or more modules corresponding to the functions.

According to an eleventh aspect, a scheduling request processing apparatus is provided, including a processor and a memory that are configured to support the apparatus in performing a corresponding function in the foregoing method. The processor is connected to the memory through communication; the memory stores a program; and the processor is configured to invoke the program to implement the scheduling request processing method in the fourth aspect and the implementations of the fourth aspect.

According to a twelfth aspect, a scheduling request processing apparatus is provided, including a processing module and a storage module that are configured to support the apparatus in performing the functions in the fourth aspect or any possible implementation of the fourth aspect. The function may be implemented by hardware, or may be implemented by hardware by executing corresponding software. The hardware or software includes one or more modules corresponding to the functions.

According to a thirteenth aspect, a computer readable medium is provided, and is configured to store a computer program, where the computer program includes an instruction used to perform the method in the first aspect or any possible implementation of the first aspect.

According to a fourteenth aspect, a computer readable medium is provided, and is configured to store a computer program, where the computer program includes an instruction used to perform the method in the second aspect or any possible implementation of the second aspect.

According to a fifteenth aspect, a computer readable medium is provided, and is configured to store a computer program, where the computer program includes an instruction used to perform the method in the third aspect or any possible implementation of the third aspect.

According to a sixteenth aspect, a computer readable medium is provided, and is configured to store a computer program, where the computer program includes an instruction used to perform the method in the fourth aspect or any possible implementation of the fourth aspect.

DESCRIPTION OF EMBODIMENTS

The following describes technical solutions of this application with reference to accompanying drawings.

It should be understood that the technical solutions of this application may be applied to various communications systems, such as an LTE system, an LTE frequency division duplex (FDD) system, an LTE time division duplex (TDD) system, a universal mobile telecommunications system (UMTS), a worldwide interoperability for microwave access (WiMAX) communications system, a public land mobile network (PLMN) system, a device-to-device (D2D) network system, or a machine-to-machine (M2M) network system, and a future 5G communications system.

It should be further understood that, in the embodiments of this application, a scheduling request processing apparatus may be a terminal device. The terminal device may also be referred to as user equipment, a mobile station (MS), a mobile terminal, or the like. The terminal device may communicate with one or more core networks by using a radio access network (RAN). For example, the terminal device may be a mobile phone (or referred to as a "cellular" phone), or a computer having a communication function. For example, alternatively, the terminal device may be a portable, pocket-sized, handheld, computer built-in, or in-vehicle mobile apparatus.

It should be further understood that a network device may be a device configured to communicate with the terminal device, and the network device may be an evolved NodeB (eNB or eNodeB) or an access point in the LTE system, an in-vehicle device, a wearable device, a network device in a future 5G network, or a network device in a future evolved PLMN. This is not limited in the embodiments of this application.

In a current SR sending mechanism, only one timer controls sending of SRs triggered for all types of services, and differentiated requirements of different services for reliability and latency of requesting a scheduling grant cannot be met. For example, an uplink sending latency required by a URLLC service is 0.5 ms, while an uplink sending latency required by an eMBB service is 4 ms, and in this case, one timer is used to control sending of SRs triggered for the two services, and consequently, the uplink sending latency requirement of the URLLC service cannot be met, data transmission latency of the URLLC service is increased, and user experience is poor.

Figure 1:
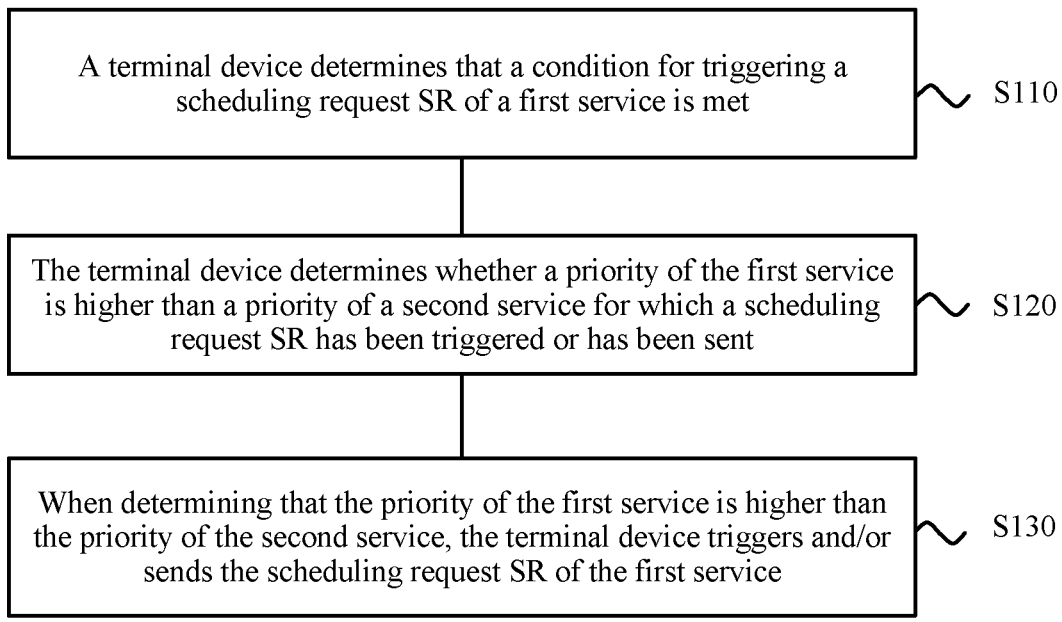
FIG. 1 is a schematic flowchart of a scheduling request method according to an embodiment of this application.

Based on a problem that a current SR sending mechanism cannot meet differentiated requirements for different service latencies, an embodiment of this application provides a scheduling request processing method. FIG. 1 is a schematic flowchart of a scheduling method 100 according to this embodiment of this application. The method 100 may be performed by a terminal device. As shown in FIG. 1, the method 100 includes the following steps.

S110. A terminal device determines that a condition for triggering a scheduling request SR of a first service is met.

S120. The terminal device determines whether a priority of the first service is higher than a priority of a second service for which a scheduling request SR has been triggered or has been sent.

S130. When determining that the priority of the first service is higher than the priority of the second service, the terminal device triggers and/or sends the scheduling request SR of the first service.

According to the scheduling request processing method provided in this embodiment of this application, when the terminal device determines, based on service priorities, that the priority of the first service that currently needs to request an uplink resource is higher than the priority of the second service for which the scheduling request SR has been triggered or has been sent, the SR triggered and/or sent for the first service with the higher priority is not affected by the SR triggered or sent for the second service with the lower priority, that is, the SR is sent according to an original period. In this way, opportunities for triggering or sending the SR of the first service can be increased, reliability of triggering or sending the SR by the first service can be improved, a latency value is reduced, and user experience can be improved.

Specifically, in S110, when the terminal device needs to transmit uplink data of the first service, but the terminal device does not have an uplink resource for sending the uplink data, the terminal device determines that the condition for triggering the scheduling request SR of the first service is met. The terminal device may notify, by using the SR, the network device that the terminal device needs an RB resource to transmit the uplink data, so as to request the uplink resource to be used to send the data of the first service.

In S120, the terminal device determines whether the priority of the first service is higher than the priority of the second service for which the scheduling request SR has been triggered or has been sent. That is, before the first service requests the uplink resource, if the second service also requests the uplink resource, and the terminal device has triggered or has sent the SR corresponding to the second service, in this case, the terminal device may compare the priority of the first service with the priority of the second service. In this way, the SRs corresponding to the different services can be treated differently based on the priorities of the different services, and differentiated requirements of the different services can be met.

In S130, when the terminal device determines that the priority of the first service is higher than the priority of the second service, after determining that the condition for triggering the scheduling request SR of the first service is met, the terminal device may trigger and/or send the scheduling request SR of the first service; that is, when the priority of the first service is higher than the priority of the second service, the SR triggered and/or sent for the first service is not affected by the SR triggered and/or sent for the second service. The SR is triggered and/or sent according to the original period.

It should be understood that the triggering and/or sending of the SR of the first service may be controlled by a timer, and the timer is configured to limit the sending of the SR. When the timer is running, the SR of the first service is not triggered and/or is not sent before the timer expires, and the SR of the first service can be triggered and/or sent only after the timer expires. Alternatively, the triggering and/or sending of the SR of the first service may not be controlled by the timer. This is not limited in this embodiment of this application.

It should be understood that the first service and the second service are merely used to represent two services with different priorities, and shall not constitute any limitation on this embodiment of this application.

Optionally, in an embodiment, the method 100 may further include:

when an uplink resource of the SR of the first service is different from an uplink resource of the SR of the second service, independently triggering and/or sending, by the terminal device, the SR of the first service and the SR of the second service.

Specifically, when the uplink resource to be used to send the SR of the first service is different from the uplink resource that has been used to send the SR of the second service, the SR of the first service and the SR of the second service may be independently sent and/or triggered, that is, the SR of the first service and the SR of the second service may be sent and/or triggered independently of each other. It should be understood that, when the resource used to send the SR of the first service is different from the resource used to send the SR of the first service, the SR of the first service and the SR of the second service may be triggered and/or sent according to a same period or different periods. This is not limited in this embodiment of this application.

Figure 2:
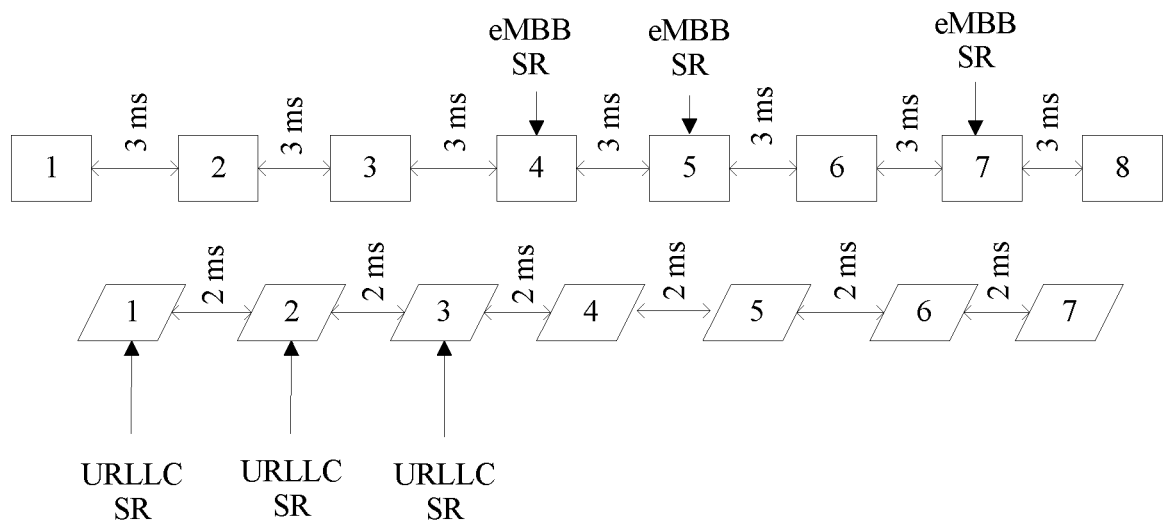
FIG. 2 is schematic flowcharts of sending an SR of a URLLC service and an SR of an eMBB service when an available time-frequency resource used to send the SR of the URLLC service is different from an available time-frequency resource used to send the SR of the eMBB service according to an embodiment of this application.

An example in which the first service is a URLLC service and the second service is an eMBB service is used for description. FIG. 2 is a schematic flowchart of triggering or sending an SR of the URLLC service and an SR of the eMBB service when an uplink resource used to send the SR of the URLLC service is different from an uplink resource used the SR of the eMBB service according to an embodiment of this application. In FIG. 2, each parallelogram is a period point and is an available time-frequency resource, a time interval between two adjacent period points is 2 ms, and all parallelograms are combined as a set of available time-frequency resources. Each small rectangle is a period point and is an available time-frequency resource, a time interval between two adjacent period points is 3 ms, and all small rectangles are combined as a set of available time-frequency resources. The SR of the eMBB service is sent by using the set of time-frequency resources formed by the rectangles. The SR triggered for the URLLC service is sent by using the set of time-frequency resources represented by the parallelograms. Because the two sets of resources are different, the triggering or sending periods may be the same, or may be different. It should be understood that, alternatively, the SR triggered for the URLLC service may be sent by using the set of time-frequency resources formed by the rectangles, and the SR triggered for the eMBB may be sent by using the set of time-frequency resources represented by the parallelograms. This is not limited in this embodiment of this application.

Optionally, the triggering and/or sending of the SR of the first service may be controlled by a first timer, and the first timer is corresponding to the SR of the first service. For example, the first timer is used to limit the triggering or sending of the SR; and when the first timer is running, the terminal device does not trigger or does not send the SR of the first service before the first timer expires, and the SR of the first service can be triggered or sent only after the first timer expires.

Optionally, the triggering and/or sending of the SR of the second service may be controlled by a second timer, and the second timer is corresponding to the SR of the second service. For example, the second timer is used to limit the triggering or sending of the SR; and when the second timer is running, the terminal device does not trigger or does not send the SR of the second service before the second timer expires, and the SR of the second service can be triggered or sent only after the second timer expires.

It should be understood that the triggering and/or sending of the SR of the first service or the triggering and/or sending of the SR of the second service may not be affected by the corresponding timer. This is not limited in this embodiment of this application.

Optionally, in an embodiment, the method 100 may further include:

when the uplink resource of the SR of the first service is the same as the uplink resource of the SR of the second service, triggering and/or sending, by the terminal device, only the SR of the first service, without triggering and/or sending the SR of the second service.

Specifically, when the resource to be used to send the SR of the first service is the same as the resource that has been used to send the SR of the second service, because the priority of the first service is higher than the priority of the second service, the SR of the first service is triggered and/or sent, and the SR of the second service is not triggered and/or is not sent. In this way, resources can be saved. It should be understood that in this case, the SR of the second service may also be triggered and/or sent. Because the second service and the first service are of different priorities, a moment at which the SR of the second service is sent may be different from a moment at which the SR of the first service is sent; that is, the SR of the second service and the SR of the first service are sent in different subframes. If only the first service exists, the moment at which the SR of the first service is sent may be calculated according to a formula (1):

$$(10 \times n_f \lfloor n_s \div 2 \rfloor - N_{OFFSET,SR}) \bmod SR_{PERIODICITY} = 0 \qquad (1)$$

In formula (1), $n_f$ is a current system frame number ranging from 0 to 1023, $n_s$ is a current slot number ranging from 0 to 19, $N_{OFFSET,SR}$ is subframe offset, and $SR_{PERIODICITY}$ is a transmission period of the SR. According to formula (1), the moment at which the SR of the first service is sent can be calculated. For two or more services, moments at which SRs of the two or more services may be determined by multiplying $SR_{PERIODICITY}$ by a TTI of a corresponding service. Because TTIs of different services are different, even if the resource used to send the SR of the first service is the same as the resource used to send the SR of the first service, the moment at which the SR of the first service is sent is different from the moment at which the SR of the second service is sent.

Optionally, when the uplink resource of the SR of the first service is the same as the uplink resource of the SR of the second service, the SR of the first service may further include indication information used to indicate the first service, and the SR of the second service may further include indication information used to indicate the second service.

Specifically, the SR does not include information about the service, for example, the SR does not include information such as an amount of data of the service, a type of the service, a TTI of a resource required by the service, or CP; and the SR is only used to notify the network device that the terminal device requests the network device to allocate resources for sending data. Therefore, after receiving an SR, the network device does not know a specific type of a resource requested by the SR, and consequently, does not know a specific type of a resource that needs to be scheduled for the terminal device. When SRs of two services are sent, if the uplink resource of the SR of the first service is the same as the uplink resource of the SR of the second service, that is, the network device receives two SRs on a same resource, in this case, the SR of the first service may further include indication information used to indicate the first service, and the SR of the second service may further include indication information used to indicate the second service. The indication information used to indicate the first service and the indication information used to indicate the second service is used by the network device to identify SRs corresponding to different services, so that different resources can be allocated to different services based on differences of the services. In this way, service data can be transmitted faster, and user experience can be improved.

Optionally, in an embodiment, the method 100 may further include:

setting, by the terminal device, a value of a time length of the first timer associated with the SR of the first service to zero; or keeping from setting, by the terminal device, the first timer associated with the SR of the first service.

Specifically, because the first service has a higher priority, the triggering and/or sending of the SR of the first service may not be affected by the first timer, that is, the value of the time length of the first timer associated with the SR of the first service may be set to zero, or the first timer associated with the SR of the first service is not set. In this way, finally, the SR of the first service is triggered and/or sent according to the original period, so that opportunities for triggering and/or sending the SR by a high-priority service can be increased, reliability of sending data by the high-priority service can be improved, and user experience can be improved.

Optionally, in an embodiment, the first timer corresponding to the SR of the first service controls the triggering or sending of the SR of the first service, and the second timer corresponding to the SR of the second service controls the triggering or sending of the SR of the second service. After sending the SR of the first service, the terminal device starts the first timer corresponding to the SR of the first service. The value of the time length of the first timer is less than a value of a time length of the second timer associated with the SR of the second service.

Specifically, because the first service has the higher priority, the opportunities for triggering and/or sending the SR of the first service needs to be increased. Because an SR sending period configured by a system is relatively short, to avoid sending of excessive SRs, the first timer corresponding to the SR of the first service may be started to control the triggering and/or sending of the SR of the first service. In addition, because the priority of the first service is higher than the priority of the second service, the opportunities for triggering and/or sending the SR of the first service should be more than opportunities for triggering and/or sending the SR of the second service. The triggering and/or sending of the SR of the second service is controlled by the second timer, and the value of the time length of the first timer should be less than the value of the time length of the second timer associated with the SR of the second service.

Optionally, in an embodiment, the method 100 may further include:

stopping, by the terminal device, the second timer; and setting, by the terminal device, the value of the time length of the second timer to the value of the time length of the first timer, and restarting the second timer.

Specifically, because the value of the time length of the first timer is less than the value of the time length of the second timer, the terminal device may set the value of the time length of the second timer to the value of the time length of the first timer. That is, both the first timer and the second timer are started, and the values of the time lengths of the two timers are the same. In this way, the SR of the first service and the SR of the second service may be triggered and/or sent based on the values of the time lengths of the timers, thereby increasing opportunities for triggering and/or sending the SR of the first service and the SR of the second service, and improving reliability of sending data by the two services.

It should be understood that the triggering and/or sending of the SR of the first service may be controlled based on the value of the time length of the first timer, or may not be affected by the first timer, and this is not limited in this embodiment of this application.

Optionally, the triggering and/or sending of the SR of the first service may be affected by the first timer associated with the first service, and the triggering and/or sending of the SR of the second service may be affected by the second timer associated with the second service, and in this case, the value of the time length of the first timer is less than the value of the time length of the second timer. Alternatively, the triggering and/or sending of the SR of the first service may not be affected by the first timer, and the triggering and/or sending of the SR of the second service may be affected by the second timer.

Figure 3:
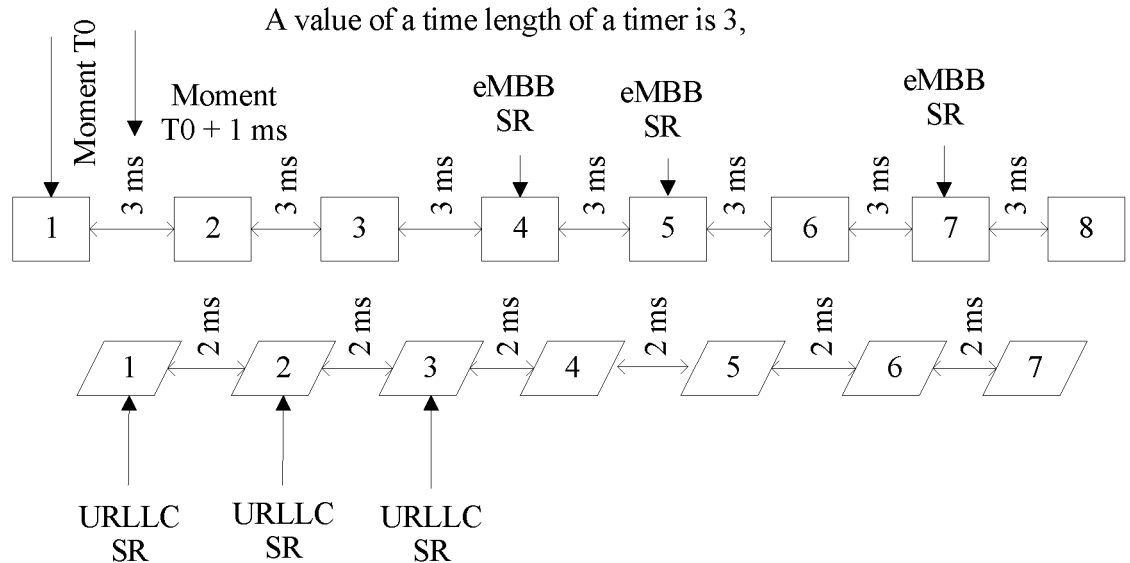
FIG. 3 is schematic flowcharts of sending an SR of a URLLC service and an SR of an eMBB service when an available time-frequency resource used to send the SR of the URLLC service is different from an available time-frequency resource used to send the SR of the eMBB service according to an embodiment of this application.

The example in which the first service is the URLLC service and the second service is the eMBB service is used for description. According to an embodiment of this application, FIG. 3 is a schematic flowchart of sending the SR of the URLLC service and the SR of the eMBB service when an available time-frequency resource used to send the SR of the URLLC service is the same as an available time-frequency resource used the SR of the eMBB service and when sending of the SR of the eMBB service is affected by the timer but sending of the SR of the URLLC service is not affected by the timer. As shown in FIG. 3, each small rectangle is a period point and is an available time-frequency resource, and all small rectangles are combined as a set of available uplink resources. Assuming that a period of a resource that carries the SR of the eMBB service is 3 ms, but a prohibit time length set by the timer is three periods of resources that carry the SR of the eMBB service, that is, a period of sending the SR of the eMBB service is three periods of resources that carry the SR of the eMBB service. Assuming that a moment T0 is a first period point, the terminal device triggers the SR of the eMBB service at the moment T0, because of the control of the timer, the SR of the eMBB service can be sent at a moment T0+9 ms, that is, sent at a fourth period point, and cannot be sent at a moment T0+3 ms (a second period point), a moment T0+6 ms (a third period point), a moment T0+12 ms (a fifth period point), or a moment T0+15 ms (a sixth period point). Assuming that the terminal device triggers the SR of the eMBB service at a moment T0+1 ms, because of the control of the timer, the terminal device can send the SR of the eMBB service only after a moment T0+10 ms, that is, only after the timer expires; however, because no time-frequency resource can be used to send the SR of the eMBB service at the moment T0+10 ms, the SR of the eMBB service can be sent only at the T0+12 ms (the fifth period point).

When the terminal device triggers the SR of the URLLC service, assuming that T0 is a period point of the resource used to send the SR of the URLLC service, the terminal device triggers the SR of the URLLC service at the moment T0, then, the SR of the URLLC service can be sent at each period point. Starting at the moment T0, for example, within 9 ms, the SR of the URLLC service can be sent at the moment T0 (the first period point), the moment T0+3 ms (the second period point), the moment T0+6 ms (the third period point), and the moment T0+9 ms (the fourth period point), that is, the SR of the URLLC service can be sent four times; however, starting at the moment T0, and within 9 ms, the SR of the eMBB service can be sent only once because of the control of the timer. Assuming that the terminal device triggers the SR of the URLLC at the moment T0+1 ms, the terminal device can send the SR of the URLLC service at the moment T0+3 ms (the second period point), the moment T0+6 ms (the third period point), and the moment T0+9 ms (the fourth period point). Therefore, starting at the moment T1, and within the same time period, for example, within 9 ms, the SR of the URLLC service can be sent three times, but the SR of the eMBB service can be sent only once. In this way, opportunities for triggering or sending the SR of the high-priority URLLC service are increased, thereby reducing a waiting time of obtaining the resource required to send data of the URLLC service, ensuring reliability of transmitting data of the URLLC service, and improving user experience.

Optionally, in an embodiment, the method 100 may further include:

stopping, by the terminal device, the second timer, and associating the triggering or sending of the SR of the second service with the first timer.

Specifically, because the value of the time length of the first timer is less than the value of the time length of the second timer, after the terminal device starts the first timer, the second timer may be stopped; that is, only one first timer whose time length is shorter is used to control the triggering and/or sending of the SRs of the two services. In this way, the SR of the first service and the SR of the second service may be triggered and/or sent based on the value of the time length of the first timer, thereby increasing opportunities for triggering or sending the SR of the first service and the SR of the second service, and improving reliability of sending data by the two services.

It should be understood that the triggering and/or sending of the SR of the first service may be controlled based on the value of the time length of the first timer, or may not be affected by the first timer, and this is not limited in this embodiment of this application.

Optionally, in an embodiment, the method 100 may further include:

stopping, by the terminal device, the second timer associated with the SR of the second service, and restarting the second timer after establishing an association between the value of the time length of the second timer and the SR of the first service.

Specifically, when the SR of the second service is triggered and/or sent based on the second timer associated with the SR of the second service, if the first service with the higher priority triggers and/or sends the SR, the terminal device may stop the second timer, set the value of the time length of the second timer to be associated with the first service with the higher priority, and restart the second timer, that is, set the value of the time length of the second timer to be shorter. In this way, the second service may trigger and/or send the SR based on the value of the time length of the second timer whose time length is shorter, so that the opportunities for triggering and/or sending the SR of the second service are increased, and reliability of sending data by the second service is improved.

It should be understood that the triggering and/or sending of the SR of the first service may be controlled based on the value of the time length of the second timer, or may not be affected by the second timer, and this is not limited in this embodiment of this application.

Optionally, before the terminal device obtains a scheduling grant, the terminal device calculates, by accumulating from zero, a quantity of times that the SR of the first service is sent, until a maximum quantity of sending times is reached.

Specifically, after the terminal device triggers and/or sends the SR of the second service, the terminal device starts the timer corresponding to the SR of the second service; and before obtaining the scheduling grant, the terminal device triggers or sends the SR of the first service. Alternatively, after the terminal device triggers or sends the SR of the first service, the terminal device starts the timer corresponding to the SR of the first service; and before obtaining the scheduling grant, the terminal device triggers or sends the SR of the first service. In this case, the accumulated quantity of times that the SR of the first service is sent can be counted in two manners. One manner is as follows: the timer is ignored, and the terminal device calculates, by accumulating from zero, the quantity of times that the SR of the first service is sent, until the maximum quantity of sending times specified by the system is reached. If the terminal device has not obtain the requested resource from the network device by far, the terminal device releases a time-frequency resource that carries the SR of the first service, and requests the resource by initiating a contention random access process. Another manner is as follows: the terminal device stops the timer, and before the timer stops, the quantity of times that the SR of the first service is sent continues to be accumulated on the basis of a quantity of times that the second service triggers or sends the SR. When the maximum quantity of sending times specified by the system is reached, if the terminal device does not obtain the requested resource from the network device, the terminal device releases the resource that carries the SR of the first service, and requests the resource by initiating the contention random access process.

It should be further understood that the first service and the second service are merely used to indicate that the two services are of different priorities, and shall not constitute any limitation on this embodiment of this application. For example, the priority of the first service may be higher than the priority of the second service, or there may be more than two services, and technical solutions in this embodiment of this application may be applicable to the services, provided that latency requirements or reliability requirements of these services are different. This is not limited in this embodiment of this application.

It should be further understood that, in addition to a priority order, a specific service or some services that is or are out of control of the timer may be determined based on another order, for example, an order of latency values or reliability of different services, and this is not limited in this embodiment of this application.

Therefore, according to the method for processing scheduling request in this embodiment of this application, when the terminal device determines, based on service priorities, that the priority of the first service that currently needs to request the uplink resource is higher than the priority of the second service for which the scheduling request SR has been triggered or has been sent, the SR triggered or sent for the first service with the higher priority may not be affected by the timer corresponding to the second service with the lower priority, or the SR of the first service may be triggered and/or sent under the control of the timer associated with the SR of the first service, and in addition, the SR of the second service may be triggered and/or sent based on the value of the time length of the first timer. In this way, opportunities for triggering or sending the SR of the first service and the SR of the second service can be increased, reliability of triggering or sending the SRs by the two services is improved, the latency value can be reduced, and user experience can be improved.

Figure 4:
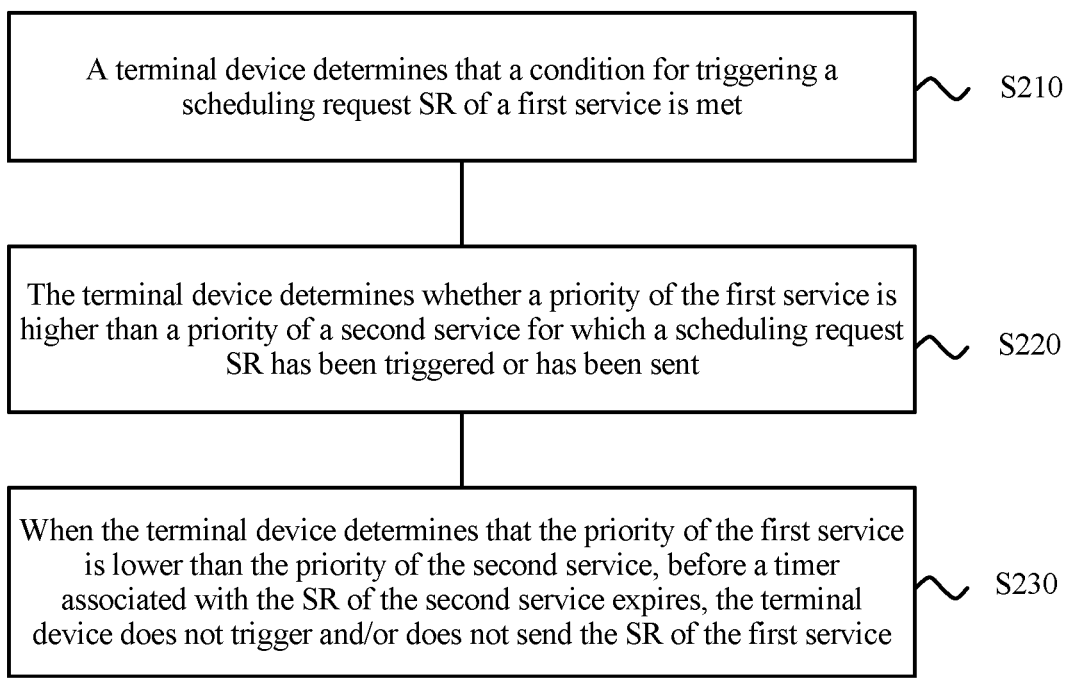
FIG. 4 is a schematic flowchart of a scheduling request processing method according to another embodiment of this application.

An embodiment of this application further provides a scheduling request processing method 200. FIG. 4 is a schematic flowchart of the scheduling request processing method 200 according to this embodiment of this application. The method 200 may be performed by a terminal device, and the method 200 includes the following steps.

S210. A terminal device determines that a condition for triggering a scheduling request SR of a first service is met.

S220. The terminal device determines whether a priority of the first service is higher than a priority of a second service for which a scheduling request SR has been triggered or has been sent.

S230. When the terminal device determines that the priority of the first service is lower than the priority of the second service, before a timer associated with the SR of the second service expires, the terminal device does not trigger and/or does not send the SR of the first service.

According to the scheduling request processing method provided in this embodiment of this application, when the terminal device determines, based on service priorities, that the priority of the first service that currently needs to request an uplink resource is lower than the priority of the second service for which the scheduling request SR has been triggered and/or has been sent, before the timer associated with the SR of the second service expires, the first service with the lower priority does not trigger and/or does not send the SR. In this way, triggering and/or sending of the SR of the first service may be controlled by the timer associated with the SR of the second service, so that opportunities for triggering or sending the SR of the first service can be increased, reliability of triggering or sending the SR by the first service can be improved, and user experience can be improved.

Specifically, in S210, when the terminal device needs to transmit uplink data of the first service, but the terminal device does not have an uplink resource for sending the uplink data, the terminal device determines that the condition for triggering the scheduling request SR of the first service is met. The terminal device may notify, by using the SR, the network device that the terminal device needs an RB resource to transmit the uplink data, so as to request the uplink resource to be used to send the data of the first service.

In S220, the terminal device determines whether the priority of the first service is higher than the priority of the second service for which the scheduling request SR has been triggered and/or has been sent. That is, before the first service requests the uplink resource, if the second service also requests the uplink resource, and the terminal device has triggered or has sent the SR corresponding to the second service, in this case, the terminal device may compare the priority of the first service with the priority of the second service. In this way, the SRs corresponding to the different services can be treated differently based on the priorities of the different services, and differentiated requirements of the different services can be met.

In S230, when the terminal device determines that the priority of the first service is lower than the priority of the second service, before the timer associated with the SR of the second service expires, the first service with the lower priority does not trigger and/or does not send the SR. In this way, the triggering or sending of the SR of the first service may be controlled by the timer associated with the SR of the second service.

It should be understood that the triggering and/or sending of the SR of the second service may be controlled by the timer, and the timer is configured to limit the sending of the SR. When the timer is running, the SR of the second service is not triggered and/or is not sent before the timer expires, and the SR of the second service can be triggered and/or sent only after the timer expires. Alternatively, the triggering and/or sending of the SR of the second service may not be controlled by the timer. This is not limited in this embodiment of this application.

It should be understood that the first service and the second service are merely used to represent two services with different priorities, and shall not constitute any limitation on this embodiment of this application.

Optionally, a value of a time length of the timer associated with the SR of the second service is less than a value of a time length of a timer associated with the SR of the first service.

Specifically, the priority of the second service is higher than the priority of the first service, and to increase opportunities for triggering or sending the SR by the first service, when both the SR of the first service and the SR of the second service are affected by the timer, the value of the time length of the timer associated with the SR of the second service is less than the value of the time length of the timer associated with the SR of the first service. In this way, within a same time period, the second service has more opportunities for triggering and/or sending the SR than the first service, so that opportunities for triggering or sending the SR of the second service are increased, and reliability of triggering and/or sending the SR by the second service is improved, and user experience is improved.

Figure 5:
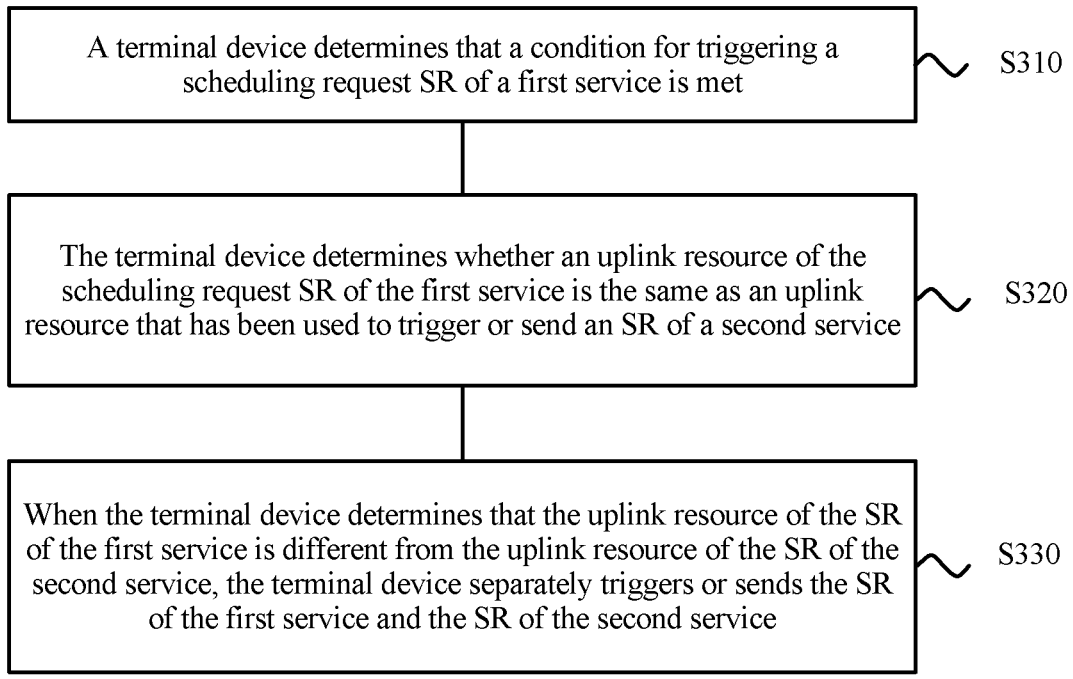
FIG. 5 is a schematic flowchart of a scheduling request processing method according to still another embodiment of this application.

An embodiment of this application further provides a scheduling request processing method 300. FIG. 5 is a schematic flowchart of the scheduling request processing method 300 according to this embodiment of this application. The method 300 may be performed by a terminal device, and the method 300 includes the following steps.

S310. A terminal device determines that a condition for triggering a scheduling request SR of a first service is met.

S320. The terminal device determines whether an uplink resource of the scheduling request SR of the first service is the same as an uplink resource that has been used to trigger or send an SR of a second service.

S330. When the terminal device determines that the uplink resource of the SR of the first service is different from the uplink resource of the SR of the second service, the terminal device independently triggers or sends the SR of the first service and the SR of the second service.

According to the scheduling request processing method provided in this embodiment of this application, before the first service requests the uplink resource, if the second service also requests the uplink resource, and the terminal device has triggered or has sent the SR corresponding to the second service, in this case, when the terminal device determines that the uplink resource to be used to send the SR of the first service is different from the uplink resource that has been used to send the SR of the second service, the SR of the first service and the SR of the second service may be independently sent and/or triggered, that is, the SR of the first service and the SR of the second service may be sent and/or triggered without mutual interference on each other. Therefore, efficiency of sending or triggering the SR of the first service and the SR of the second service may be improved, and reliability of sending or triggering the SR is ensured.

Optionally, triggering and/or sending of the SR of the first service may be controlled by a first timer, and the first timer is corresponding to the SR of the first service. For example, the first timer is used to limit the triggering or sending of the SR. When the first timer is running, the terminal device does not trigger or does not send the SR of the first service before the first timer expires, and the SR of the first service can be triggered or sent only after the first timer expires.

Optionally, triggering and/or sending of the SR of the second service may be controlled by a second timer, and the second timer is corresponding to the SR of the second service. For example, the second timer is used to limit the triggering or sending of the SR. When the second timer is running, the terminal device does not trigger or does not send the SR of the second service before the second timer expires, and the SR of the second service can be triggered or sent only after the second timer expires.

It should be understood that the triggering and/or sending of the SR of the first service or the triggering and/or sending of the SR of the second service may not be affected by the corresponding timer. This is not limited in this embodiment of this application.

Optionally, in an embodiment, the method 300 may further include:

when the terminal device determines that the uplink resource requested by the SR of the first service is the same as the uplink resource requested by the SR of the second service, and a priority of the first service is lower than a priority of the second service, keeping from triggering and/or sending, by the terminal device, the SR of the first service until the timer associated with the SR of the second service expires.

Specifically, when the terminal device determines that the uplink resource requested by the SR of the first service is the same as the uplink resource requested by the SR of the second service, and the priority of the first service is lower than the priority of the second service, the first service with the lower priority does not trigger and/or does not send the SR before the timer associated with the SR of the second service expires, and the triggering and/or sending of the SR of the first service may be controlled by the timer associated with the SR of the second service, so that opportunities for triggering and/or sending the SR of the first service can be increased, reliability of triggering and/or sending the SR by first service can be improved, and user experience can be improved.

It should be understood that triggering and/or sending of the SR of the second service may be controlled by the timer associated with the SR of the second service, and the timer is configured to limit sending of the SR. When the timer is running, the SR of the second service is not triggered and/or is not sent before the timer expires, and the SR of the second service can be triggered and/or sent only after the timer expires. Alternatively, the triggering and/or sending of the SR of the second service may not be controlled by the timer. This is not limited in this embodiment of this application.

It should be further understood that, when the uplink resource to be used to send the SR of the first service is different from the uplink resource that has been used to send the SR of the second service, the SR of the first service and the SR of the second service may be triggered and/or sent according to a same period or different periods. This is not limited in this embodiment of this application.

Figure 6:
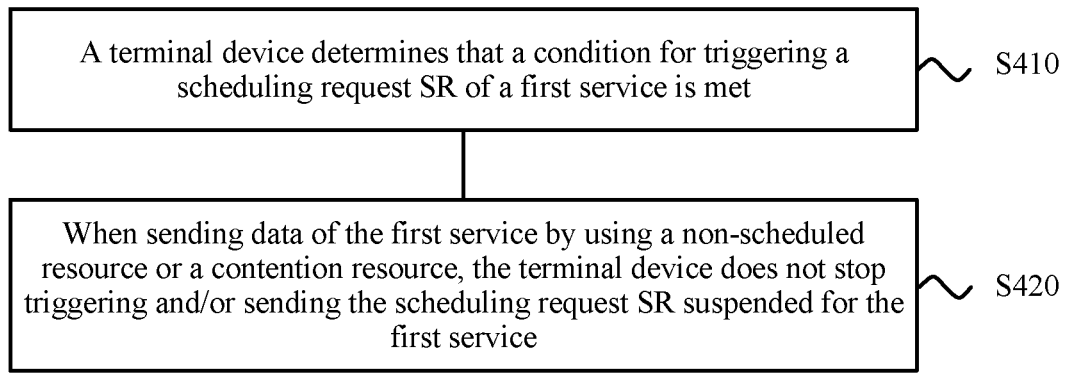
FIG. 6 is a schematic flowchart of a scheduling request processing method according to still another embodiment of this application.

An embodiment of this application further provides a scheduling request processing method 400. FIG. 6 is a schematic flowchart of the scheduling request processing method 400 according to this embodiment of this application. The method 400 may be performed by a terminal device, and the method 400 includes the following steps.

S410. A terminal device determines that a condition for triggering a scheduling request SR of a first service is met.

S420. When the terminal device sends data of the first service by using a non-scheduled resource or a contention based resource, the terminal device does not stop triggering and/or sending the scheduling request SR of the first service.

Specifically, when determining a service that needs to be sent, that is, when determining that the condition for triggering the scheduling request SR of the first service is met, the terminal device further obtains the non-scheduled resource used to send the data of the first service. In this case, when the non-scheduled resource is used to send the data of the first service, the terminal device does not stop triggering and/or sending the SR of the first service or an SR of a second service. In this way, it can be ensured that the data of the service can be effectively transmitted to a network device; that is, when the data of the service is sent by using the non-scheduled resource, a dedicated scheduled resource is also requested. Therefore, reliability of transmitting the data of the service is improved.

Optionally, in an embodiment, the method 400 may further include:

after successfully sending the data of the service by using the non-scheduled resource or the contention based resource, stopping, by the terminal device, triggering and/or sending the SR of the service.

Specifically, when the non-scheduled resource is used to send the data of the service, to ensure that the data can be successfully sent, the terminal device does not stop triggering and/or sending the SR of the service; however, when it is determined that the data of the service is successfully sent by using the non-scheduled resource, the terminal device stops triggering and/or sending the SR of the service. For example, whether the data of the service is successfully sent by using the non-scheduled resource may be determined based on first indication information sent by the network device. For example, the first indication information may be acknowledgment information, for example, ACK (Acknowledgement), sent to the terminal device when the network device determines that the data of the first service or data of the second service is successfully sent by using the non-scheduled resource. In this case, the terminal device correspondingly stops triggering or sending the SR of the service. In this way, not only accuracy of sending data is ensured, but also triggering or sending of an unnecessary SR is avoided, thereby avoiding a waste of resources and an increase in interaction signaling, and improving user experience.

It should be understood that the network device may further notify, by using a static indication or a dynamic indication, whether the terminal device is allowed to send the SR after the terminal device sends the data of the service or a BSR by using the non-scheduled resource, and this is not limited in this embodiment of this application.

It should be further understood that, when the SR has been sent for a limited quantity of times, or the network device has scheduled a resource for the terminal device based on the SR, the terminal device also stops triggering and/or sending the SR. This is not limited in this embodiment of this application.

Optionally, in an embodiment, the method 400 further includes:

when obtaining a sending resource used to send data of a service whose priority is lower than that of the service, stopping, by the terminal device, triggering and/or sending the SR of the service; and sending, by the terminal device, the data of the service by using the sending resource used to send the data of the service whose priority is lower than that of the service.

Specifically, after obtaining the resource that is used to send the service or that is used to send the data of the service whose priority is lower than that of the service, the terminal device may send data of different services based on a priority order of different services, that is, first send the data of the service. Because the resource used to send the data of the service is available, in this case, the terminal device determines to cancel triggering and/or sending the SR of the service. In this way, triggering or sending of an unnecessary SR can be reduced, signaling interaction is reduced, resources are saved, and user experience is improved.

Optionally, in an embodiment, when the terminal device sends the data of the service by using the non-scheduled resource, a priority order is that: a buffer status report BSR that includes a data amount of the service>the data of the service>semi-persistent scheduling SPS acknowledgment>a BSR that includes a data amount of the service whose priority is lower than that of the service>the data of the service whose priority is lower than that of the service.

Specifically, when the data of the service is sent by using the non-scheduled resource, the data of the service may be sent based on the priority order of the services, that is, the data of the service with a high priority is first sent. When the data of the different services is sent based on the priority order of the services, a BSR of the high-priority service may be first sent. The BSR may carry more information than the SR. After receiving the SR sent for the terminal device, the network device only knows that the terminal device needs to transmit data, but does not know a specific amount of the data that needs to be transmitted. Therefore, generally, the network device may first allocate a small quantity of uplink grants to the terminal device for sending the BSR by the terminal device. Therefore, after the terminal device obtains the resource used to send the service, if the resource cannot carry the data that needs to be transmitted, the data amount of the data may be stored in the BSR first, so that the BSR that includes the data amount of the service may be first sent, and then the data of the service is sent. Therefore, when only one service exists, a sending order may be that: a BSR that includes a data amount of the service ➔ the data of the service ➔ semi-persistent scheduling (SPS) acknowledgment. The semi-persistent scheduling is used by the network device to notify current scheduling information of the terminal device by using a physical downlink (PDCCH). After identifying the SPS, the terminal device saves the current scheduling information, and sends or receives the data of the service on a same time-frequency resource at a fixed interval. When the transmission is performed by using the SPS, a characteristic that a data packet can periodically arrive may be fully utilized, and one grant can be used in an entire period, so that PDCCH resources used by an LTE system for scheduling and indication can be saved. When there are a plurality of services whose priorities are different, a sending order may be that: a buffer status report BSR that includes a data amount of the first service ➔ the data of the first service ➔ SPS acknowledgment ➔ a BSR that includes a data amount of the service whose priority is lower than that of the first service ➔ the data of the service whose priority is lower than that of the first service. For example, when the first service is a URLLC service and the second service is an eMBB service, and the URLLC service has a higher priority than the eMBB service, a sending order may be that: a BSR that includes a data amount of the URLLC service ➔ data of the URLLC service ➔ SPS acknowledgment ➔ a BSR that includes a data amount of the eMBB service ➔ data of the eMBB service.

It should be understood that, when a scheduled resource is used to send the data of the service, the data of the service may also be sent in the foregoing sending order, and this is not limited in this embodiment of this application.

It should be further understood that, whether the data of the service is sent by using the scheduled resource or the data of the service is sent by using the non-scheduled resource, when a new packet arrives at a radio link control (RLC) layer/a packet data convergence protocol (packet data convergence protocol) layer, the terminal device needs to trigger the BSR, that is, needs to send the BSR, provided that a data amount of a buffer register (buffer) is greater than a specific threshold because of the arriving of the new data.

It should be further understood that, for the plurality of services, the data of the plurality of the services may be sent in the foregoing order based on the priority order, and this is not limited in this embodiment of this application.

It should be further understood that, in addition to the priority order, the data of the different services may be sent based on another order, for example, an order of latency values or reliability of different services, and this is not limited in this embodiment of this application.

It should be further understood that sequence numbers of the processes and the steps do not mean execution sequences in the embodiments of this application. The execution sequences of the processes should be determined based on functions and internal logic of the processes, and should not be construed as any limitation on the implementation processes of the embodiments of this application.

Therefore, according to the scheduling request processing method provided in this embodiment of this application, when the non-scheduled resource is used to send data of a service, the terminal device does not stop triggering or sending an SR of the service, but stops triggering or sending the SR of the service only after determining that the data of the service is successfully transmitted, and the related data of the high-priority service may be first sent based on the priority order of the services, provided that the resource is obtained, thereby reducing latency of sending the data of the high-priority service, and improving user experience.

The following describes in detail a scheduling request processing apparatus in the embodiments of this application.

Figure 7:
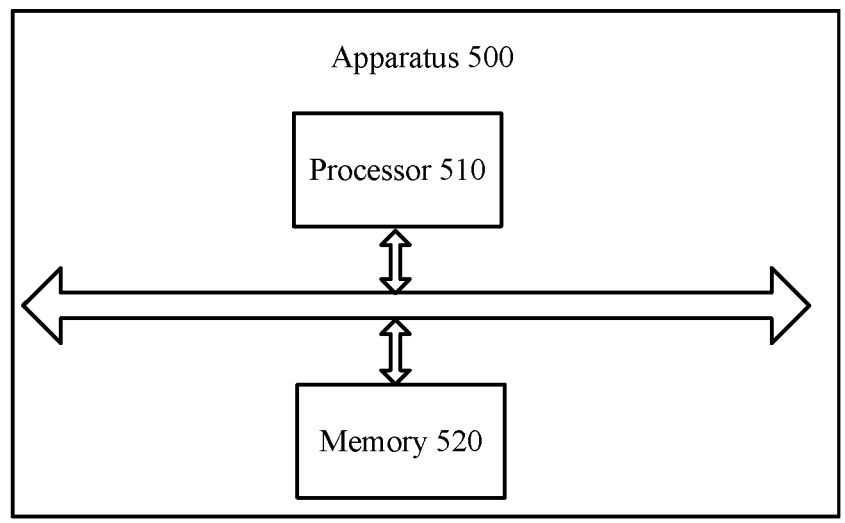
FIG. 7 is a schematic block diagram of a scheduling request processing apparatus according to an embodiment of this application.

FIG. 7 is a schematic block diagram of a scheduling request processing apparatus 500 according to an embodiment of this application. The scheduling request processing apparatus 500 includes a processor 510 and a memory 520 that stores a program to be executed by the processor 510.

The processor 510 is configured to determine that a condition for triggering a scheduling request of a first service is met.

The processor 510 is further configured to determine whether a priority of the first service is higher than a priority of a second service for which a scheduling request SR has been triggered or has been sent.

When determining that the priority of the first service is higher than the priority of the second service, the processor 510 triggers and/or sends the scheduling request SR of the first service.

When the scheduling request processing apparatus provided in this embodiment of this application determines, based on service priorities, that the priority of the first service that currently needs to request an uplink resource is higher than the priority of the second service for which the scheduling request SR has been triggered or has been sent, the SR triggered and/or sent for the first service with the higher priority is not affected by the SR triggered and/or sent for the second service with the lower priority, that is, the SR is sent according to an original period. In this way, opportunities for triggering and/or sending the SR of the first service can be increased, reliability of triggering or sending the SR by the first service can be improved, a latency value is reduced, and user experience can be improved.

The components in the scheduling request processing apparatus 500 are connected through communication; that is, the processor 510 and the memory 520 communicate with each other by using an inner connection path to transmit a control signal and/or a data signal. It should be noted that the foregoing method embodiment of this application may be applied to a processor, or implemented by a processor. The processor may be an integrated circuit chip and has a signal processing capability. In an implementation process, steps in the foregoing method embodiments can be implemented by using a hardware integrated logic circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

Optionally, in an embodiment, the processor 510 is further configured to: when an uplink resource of the SR of the first service is different from an uplink resource of the SR of the second service, independently trigger or send the SR of the first service and the SR of the second service.

Optionally, in an embodiment, a first timer corresponding to the SR of the first service controls triggering or sending of the SR of the first service, and before the first timer expires, the processor 510 is further configured to not trigger or not send the SR of the first service.

Optionally, in an embodiment, a second timer corresponding to the SR of the second service controls triggering or sending of the SR of the second service, and before the second timer expires, the processor 510 is further configured to not trigger or not send the SR of the second service.

Optionally, in an embodiment, the processor 510 is further configured to: before the scheduling request processing apparatus obtains a scheduling grant, calculate, by accumulating from zero, a quantity of times that the SR of the first service is sent, until a maximum quantity of sending times is reached.

Optionally, in an embodiment, the processor 510 is further configured to: when an uplink resource of the SR of the first service is the same as an uplink resource of the SR of the second service, trigger or send only the SR of the first service, and not trigger or not send the SR of the second service.

Optionally, in an embodiment, the processor 510 is further configured to set a value of a time length of a first timer associated with the SR of the first service to zero; or not set a first timer associated with the SR of the first service.

Optionally, in an embodiment, the first timer corresponding to the SR of the first service controls the triggering or sending of the SR of the first service, and the second timer corresponding to the SR of the second service controls the triggering or sending of the SR of the second service, where a value of a time length of the first timer is less than a value of a time length of the second timer associated with the SR of the second service.

Optionally, in an embodiment, the processor 510 is further configured to: stop the second timer; and set the value of the time length of the second timer to the value of the time length of the first timer, and restart the second timer.

Optionally, in an embodiment, the processor 510 is further configured to: stop the second timer, and associate the triggering or sending of the SR of the second service with the first timer.

Optionally, in an embodiment, the processor 510 is further configured to: stop a second timer associated with the SR of the second service, and restart the second timer after establishing an association between a value of a time length of the second timer and the SR of the first service.

Optionally, in an embodiment, the value of the time length of the timer associated with the SR of the first service is less than the value of the time length of the timer associated with the SR of the second service.

Figure 8:
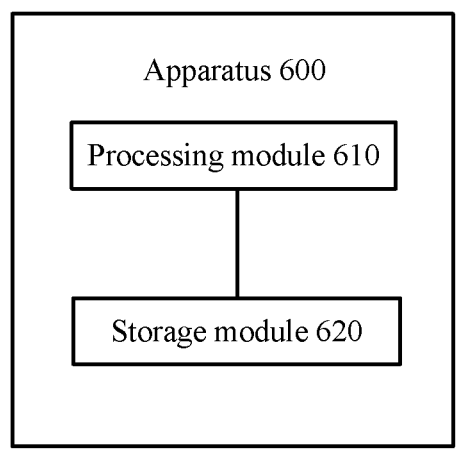
FIG. 8 is a schematic block diagram of a scheduling request processing apparatus according to another embodiment of this application.

It should be noted that, in this embodiment of this application, the processor 510 may be implemented by a processing module, and the memory 520 may be implemented by a storage module. As shown in FIG. 8, a scheduling request processing apparatus 600 may include a processing module 610 and a storage module 620.

The scheduling request processing apparatus 500 shown in FIG. 7 or the scheduling request processing apparatus 600 shown in FIG. 8 can implement the processes implemented in the foregoing embodiments in FIG. 1 to FIG. 3 and in the embodiments in the method 100. To avoid repetition, details are not described herein again.

Figure 9:
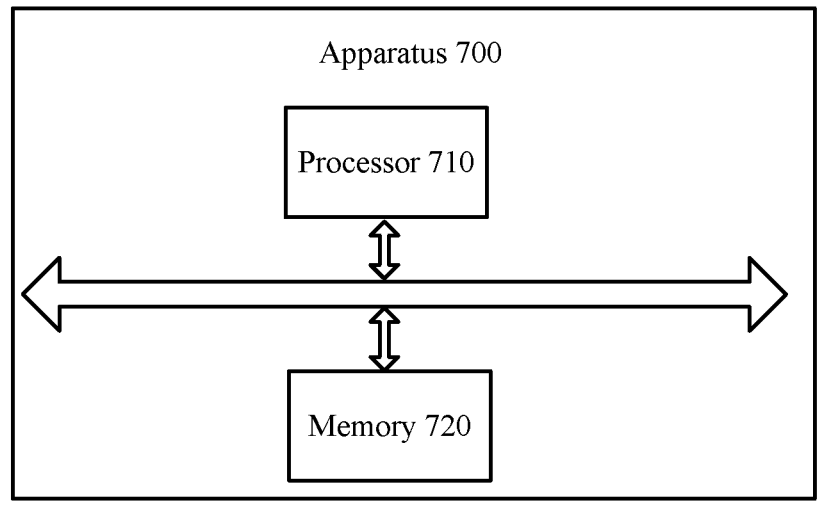
FIG. 9 is a schematic block diagram of a scheduling request processing apparatus according to an embodiment of this application.

FIG. 9 is a schematic block diagram of a scheduling request processing apparatus 700 according to an embodiment of this application. As shown in FIG. 9, the scheduling request processing apparatus 700 includes a processor 710 and a memory 720 that stores a program to be executed by the processor 710.

The processor 710 is configured to determine that a condition for triggering a scheduling request of a first service is met.

The processor 710 is further configured to determine whether a priority of the first service is higher than a priority of a second service for which a scheduling request SR has been triggered and/or has been sent.

The processor 710 is further configured to: when determining that the priority of the first service is lower than the priority of the second service, before a timer associated with the SR of the second service expires, not trigger and/or not send the SR of the first service.

When the scheduling request processing apparatus provided in this embodiment of this application determines, based on service priorities, that the priority of the first service that currently needs to request an uplink resource is lower than the priority of the second service for which the scheduling request SR has been triggered and/or has been sent, before the timer associated with the SR of the second service expires, the first service with the lower priority does not trigger and/or does not send the SR. In this way, triggering and/or sending of the SR of the first service may be controlled by the timer associated with the SR of the second service, so that opportunities for triggering or sending the SR of the first service can be increased, reliability of triggering or sending the SR by the first service can be improved, and user experience can be improved.

The components in the scheduling request processing apparatus 700 are connected through communication; that is, the processor 710 and the memory 720 communicate with each other by using an inner connection path to transmit a control signal and/or a data signal. It should be noted that the foregoing method embodiment of this application may be applied to a processor, or implemented by a processor. The processor may be an integrated circuit chip and has a signal processing capability. In an implementation process, steps in the foregoing method embodiments can be implemented by using a hardware integrated logic circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

Optionally, in an embodiment, a value of a time length of the timer associated with the SR of the second service is less than a value of a time length of a timer associated with the SR of the first service.

Figure 10:
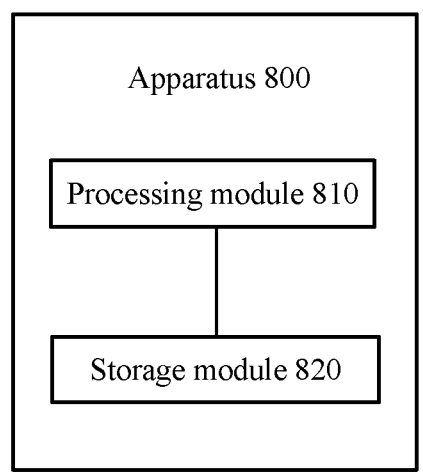
FIG. 10 is a schematic block diagram of a scheduling request processing apparatus according to another embodiment of this application.

It should be noted that, in this embodiment of this application, the processor 710 may be implemented by a processing module, and the memory 720 may be implemented by a storage module. As shown in FIG. 10, a scheduling request processing apparatus 800 may include a processing module 810 and a storage module 820.

The scheduling request processing apparatus 700 shown in FIG. 9 or the scheduling request processing apparatus 800 shown in FIG. 10 can implement the processes implemented in the foregoing embodiments in FIG. 2 to FIG. 4 and in the embodiments in the method 200. To avoid repetition, details are not described herein again.

Figure 11:
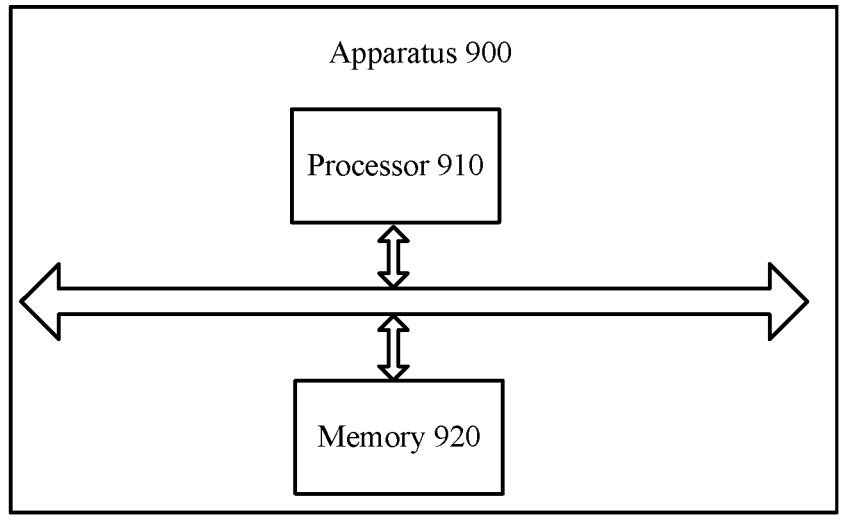
FIG. 11 is a schematic block diagram of a scheduling request processing apparatus according to an embodiment of this application.

FIG. 11 is a schematic block diagram of a scheduling request processing apparatus 900 according to an embodiment of this application. As shown in FIG. 11, the scheduling request processing apparatus 900 includes a processor 910 and a memory 920 that stores a program to be executed by the processor 910.

The processor 910 is configured to determine that a condition for triggering a scheduling request of a first service is met.

The processor 910 is further configured to determine whether an uplink resource of the scheduling request SR of the first service is the same as an uplink resource that has been used to trigger and/or send an SR of a second service.

The processor 910 is further configured to: when the uplink resource of the SR of the first service is different from the uplink resource of the SR of the second service, independently trigger and/or send the SR of the first service and the SR of the second service.

Before the first service requests the uplink resource, if the second service also requests the uplink resource, and the scheduling request processing apparatus provided in this embodiment of this application has triggered and/or has sent the SR corresponding to the second service, in this case, when the scheduling request processing apparatus determines that the uplink resource to be used to send the SR of the first service is different from the uplink resource that has been used to send the SR of the second service, the SR of the first service and the SR of the second service may be independently sent and/or triggered, that is, the SR of the first service and the SR of the second service may be sent and/or triggered without mutual interference on each other. Therefore, efficiency of sending and/or triggering the SR of the first service and the SR of the second service may be improved, and reliability of sending or triggering the SR is ensured.

The components in the scheduling request processing apparatus 900 are connected through communication; that is, the processor 910 and the memory 920 communicate with each other by using an inner connection path to transmit a control signal and/or a data signal. It should be noted that the foregoing method embodiment of this application may be applied to a processor, or implemented by a processor. The processor may be an integrated circuit chip and has a signal processing capability. In an implementation process, steps in the foregoing method embodiments can be implemented by using a hardware integrated logic circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

Optionally, in an embodiment, a first timer corresponding to the SR of the first service controls triggering or sending of the SR of the first service, and before the first timer expires, the processor 910 is further configured to not trigger and/or not send the SR of the first service.

Optionally, in an embodiment, a second timer corresponding to the SR of the second service controls triggering or sending of the SR of the second service, and before the second timer expires, the processor 910 is further configured to not trigger or not send the SR of the second service.

Optionally, in an embodiment, the processor 910 is further configured to: before the scheduling request processing apparatus obtains a scheduling grant, calculate, by accumulating from zero, a quantity of times that the SR of the first service is sent, until a maximum quantity of sending times is reached.

Optionally, in an embodiment, the value of the time length of the timer associated with the SR of the second service is less than the value of the time length of the timer associated with the SR of the first service.

Figure 12:
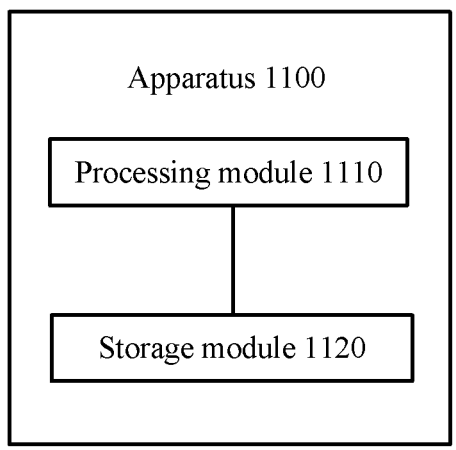
FIG. 12 is a schematic block diagram of a scheduling request processing apparatus according to another embodiment of this application.

It should be noted that, in this embodiment of this application, the processor 910 may be implemented by a processing module, and the memory 920 may be implemented by a storage module. As shown in FIG. 12, a scheduling request processing apparatus 1100 includes a processing module 1110 and a storage module 1120.

The scheduling request processing apparatus 900 shown in FIG. 11 or the scheduling request processing apparatus 1100 shown in FIG. 12 can implement the processes implemented in the foregoing embodiments in FIG. 2 to FIG. 5 and in the embodiments in the method 300. To avoid repetition, details are not described herein again.

Figure 13:
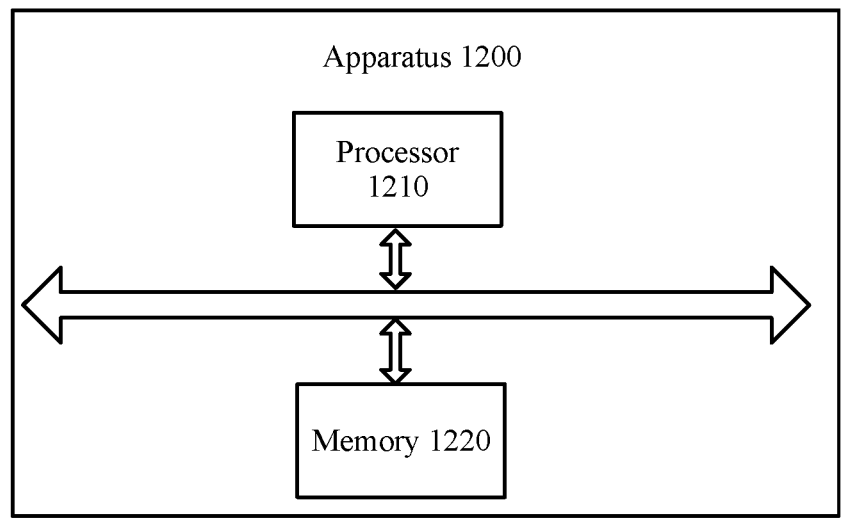
FIG. 13 is a schematic block diagram of a scheduling request processing apparatus according to an embodiment of this application.

FIG. 13 is a schematic block diagram of a scheduling request processing apparatus 1200 according to an embodiment of this application. As shown in FIG. 13, the scheduling request processing apparatus 1200 includes a processor 1210 and a memory 1220 that stores a program to be executed by the processor 1210.

The processor 1210 is configured to determine that a condition for triggering a scheduling request SR of a first service is met.

The processor 1210 is further configured to: when sending data of the first service by using a non-scheduled resource or a contention based resource, not cancel triggering and/or sending the scheduling request SR suspended for the first service.

When sending data of the service by using the non-scheduled resource, the scheduling request processing apparatus provided in this embodiment of this application does not trigger and/or send the SR of the service, but cancels the scheduling request SR suspended by the service only after determining that the data of the service is successfully transmitted, thereby ensuring reliability of sending the data of the service and improving user experience.

The components in the scheduling request processing apparatus 1200 are connected through communication; that is, the processor 1210 and the memory 1220 communicate with each other by using an inner connection path to transmit a control signal and/or a data signal. It should be noted that the foregoing method embodiment of this application may be applied to a processor, or implemented by a processor. The processor may be an integrated circuit chip and has a signal processing capability. In an implementation process, steps in the foregoing method embodiments can be implemented by using a hardware integrated logic circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

Optionally, in an embodiment, the processor 1210 is further configured to: after successfully sending the data of the service by using the non-scheduled resource or the contention based resource, cancel the scheduling request SR suspended for the service.

Optionally, in an embodiment, the processor 1210 is further configured to: when obtaining a sending resource used to send data of a service whose priority is lower than that of the service, cancel the scheduling request SR suspended for the service; and send the data of the service by using the sending resource used to send the data of the service whose priority is lower than that of the service.

Optionally, in an embodiment, when the data of the service is sent by using the non-scheduled resource, a priority order is that: a buffer status report BSR that includes a data amount of the service>the data of the service>semi-persistent scheduling SPS acknowledgment>a BSR that includes a data amount of the service whose priority is lower than that of the service>the data of the service whose priority is lower than that of the service.

Figure 14:
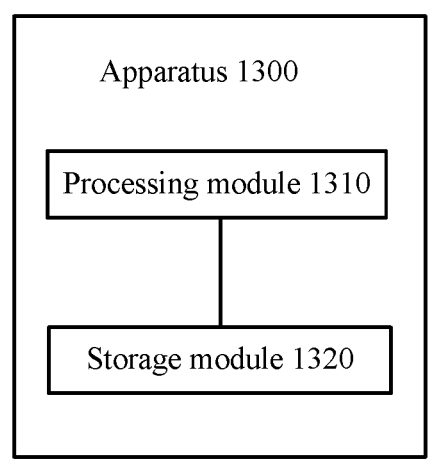
FIG. 14 is a schematic block diagram of a scheduling request processing apparatus according to another embodiment of this application.

It should be noted that, in this embodiment of this application, the processor 1210 may be implemented by a processing module, and the memory 1220 may be implemented by a storage module. As shown in FIG. 14, a scheduling request processing apparatus 1300 includes a processing module 1310 and a storage module 1320.

The scheduling request processing apparatus 1200 shown in FIG. 13 or the scheduling request processing apparatus 1300 shown in FIG. 14 can implement the processes implemented in the embodiment in FIG. 6 and in the embodiments in the method 400. To avoid repetition, details are not described herein again.

An embodiment of this application further provides a computer readable medium, configured to store computer program, where the computer program includes an instruction used to execute the scheduling request processing method in the embodiments of this application. The readable medium may be a read-only memory (ROM) or a random access memory (RAM). This is not limited in this embodiment of this application.

It should be understood that the term "and/or" and "at least one of A or B" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for processing a scheduling request, the method comprising:
   determining, by a terminal device, that a condition for triggering a scheduling request (SR) of a first service is met; and
   when an uplink resource of the SR of the first service is different from an uplink resource of an SR of a second service, independently sending, by the terminal device, the SR of the first service and the SR of the second service;
   wherein a first timer corresponding to the SR of the first service controls sending of the SR of the first service,
   wherein the terminal device keeps from sending the SR of the first service until the first timer expires,
   wherein a second timer corresponding to the SR of the second service controls sending of the SR of the second service, and wherein the terminal device keeps from sending the SR of the second service until the second timer expires.

2. The method according to claim 1, further comprising:
before the terminal device obtains a scheduling grant, separately calculating, by the terminal device by accumulating from zero, a quantity of times that the SR of the first service is sent, until a maximum quantity of sending times is reached.

3. The method according to claim 1, further comprising:
when a priority of the first service is higher than a priority of the second service, triggering, by the terminal device, the SR of the first service.

4. A non-transitory computer-readable medium storing a program that, when executed by a processor, causes a terminal device to perform:
determining that a condition for triggering a scheduling request (SR) of a first service is met; and
when an uplink resource of the SR of the first service is different from an uplink resource of an SR of a second service, independently sending the SR of the first service and the SR of the second service;
wherein a first timer corresponding to the SR of the first service controls sending of the SR of the first service,
wherein the terminal device keeps from sending the SR of the first service until the first timer expires,
wherein a second timer corresponding to the SR of the second service controls sending of the SR of the second service, and
wherein the terminal device keeps from sending the SR of the second service until the second timer expires.

5. The computer-readable medium according to claim 4, wherein the processor executing the program further causes the terminal device to:
before obtaining a scheduling grant, separately calculate by accumulating from zero, a quantity of times that the SR of the first service is sent, until a maximum quantity of sending times is reached.

6. The computer-readable medium according to claim 4, wherein the processor executing the program further causes the terminal device to:
when a priority of the first service is higher than a priority of the second service, trigger the SR of the first service.

7. A scheduling request processing apparatus, comprising:
a processor; and
a memory that stores a program to be executed by the processor, wherein the processor is configured to:
determine that a condition for triggering a scheduling request (SR) of a first service is met; and
when that an uplink resource of the SR of the first service is different from an uplink resource of an SR of a second service, cause the apparatus to independently send the SR of the first service and the SR of the second service;
wherein a first timer corresponding to the SR of the first service controls sending of the SR of the first service,
wherein the apparatus keeps from sending the SR of the first service until the first timer expires,
wherein a second timer corresponding to the SR of the second service controls sending of the SR of the second service, and
wherein the apparatus keeps from sending the SR of the second service until the second timer expires.

8. The apparatus according to claim 7, wherein the processor is further configured to:
when a priority of the first service is higher than a priority of the second service, cause the apparatus to trigger the SR of the first service.

9. The apparatus according to claim 7, the processor is further configured to:
before obtaining a scheduling grant, separately calculate, by accumulating from zero, a quantity of times that the SR of the first service is sent, until a maximum quantity of sending times is reached.

* * * * *

UNITED STATES PATENT AND TRADEMARK OFFICE
CERTIFICATE OF CORRECTION

PATENT NO. : 11,134,507 B2  
APPLICATION NO. : 16/522335  
DATED : September 28, 2021  
INVENTOR(S) : Xu et al.

Page 1 of 1

It is certified that error appears in the above-identified patent and that said Letters Patent is hereby corrected as shown below:

In the Claims

Claim 7: Column 30, Line 12: "when that an uplink resource of the SR of the first" should read -- when an uplink resource of the SR of the first --.

Signed and Sealed this  
Eighth Day of November, 2022

Katherine Kelly Vidal  
*Director of the United States Patent and Trademark Office*